(12) United States Patent
Reuterholt

(10) Patent No.: US 12,514,998 B2
(45) Date of Patent: Jan. 6, 2026

(54) MODULAR BREATHING GAS SEPARATOR UNIT

(71) Applicant: MAQUET CRITICAL CARE AB, Solna (SE)

(72) Inventor: Johan Reuterholt, Bålsta (SE)

(73) Assignee: MAQUET CRITICAL CARE AB, Solna (SE)

( * ) Notice: Subject to any disclaimer, the term of this patent is extended or adjusted under 35 U.S.C. 154(b) by 1049 days.

(21) Appl. No.: 16/772,137

(22) PCT Filed: Dec. 15, 2017

(86) PCT No.: PCT/SE2017/051285
§ 371 (c)(1),
(2) Date: Jun. 11, 2020

(87) PCT Pub. No.: WO2019/117776
PCT Pub. Date: Jun. 20, 2019

(65) Prior Publication Data
US 2021/0085898 A1    Mar. 25, 2021

(51) Int. Cl.
*A61M 16/00* (2006.01)
*A61M 16/06* (2006.01)
(Continued)

(52) U.S. Cl.
CPC ........ *A61M 16/0057* (2013.01); *A61M 16/06* (2013.01); *A61M 16/0833* (2014.02); *A61M 16/208* (2013.01); *A61M 2207/00* (2013.01)

(58) Field of Classification Search
CPC ................ A61M 16/104; A61M 16/01; A61M 16/0883; A61M 16/0891; A61M 16/0045;
(Continued)

(56) References Cited

U.S. PATENT DOCUMENTS

| 4,883,051 | A | * | 11/1989 | Westenskow | ..... A61M 16/0858 |
| | | | | | 128/205.15 |
| 5,202,023 | A | * | 4/1993 | Trimmer | ................ B01D 53/22 |
| | | | | | 210/321.89 |

(Continued)

FOREIGN PATENT DOCUMENTS

| EP | 2008679 A1 | 12/2008 | |
| WO | WO-8806904 A1 | * 9/1988 | .......... A61M 16/104 |

(Continued)

OTHER PUBLICATIONS

Office Action issued on Apr. 21, 2023 in corresponding Chinese Patent Application No. 201780097601.0, 6 pages.
(Continued)

*Primary Examiner* — Timothy A Stanis
*Assistant Examiner* — Tyler A Raubenstraw
(74) *Attorney, Agent, or Firm* — Fay Kaplun & Marcin, LLP

(57) ABSTRACT

The present invention relates to a modular breathing gas separator unit (5; 105; 205; 305) for breathing gases, the unit being connectable to a breathing system (1). The unit comprises a first module comprising a gas separation means (25, 125; 224, 225; 350) adapted to separate ventilator driving gas and patient inhalation and/or exhalation gases, and a second module comprising a carrier means (27; 127; 227; 327) adapted to support and connect the gas separator unit to an interface (101) in the breathing system. The disclosure also relates to the breathing system (1) comprising the unit.

26 Claims, 6 Drawing Sheets

(51) Int. Cl.
*A61M 16/08* (2006.01)
*A61M 16/20* (2006.01)

(58) Field of Classification Search
CPC ...... A61M 16/00875; A61M 2205/123; A61M 2209/08; A61M 16/00; A61M 16/08; A61M 16/10; A61M 16/12; A61M 16/0093; A61M 16/1065; A61M 16/009; A61M 16/105; A61M 16/0875; A61M 16/0057; A61M 11/00
See application file for complete search history.

(56) References Cited

U.S. PATENT DOCUMENTS

| | | | | |
|---|---|---|---|---|
| 5,549,105 | A * | 8/1996 | Bloch | A61M 16/08 277/924 |
| 5,673,688 | A * | 10/1997 | Tham | A61M 16/104 128/204.22 |
| 5,694,924 | A * | 12/1997 | Cewers | A61M 16/01 128/205.15 |
| 6,408,848 | B1 * | 6/2002 | Feldman | A61M 16/0045 128/200.22 |
| 6,523,538 | B1 * | 2/2003 | Wikefeldt | A61M 16/0808 128/205.12 |
| 6,745,771 | B2 * | 6/2004 | Castor | A61M 16/0093 128/205.27 |
| 7,621,272 | B2 * | 11/2009 | Orr | A61M 16/009 128/205.12 |
| 7,644,594 | B2 * | 1/2010 | Berry | A61M 16/009 128/205.12 |
| 10,022,741 | B2 * | 7/2018 | Fuller | B01F 33/841 |
| 2003/0075176 | A1 * | 4/2003 | Fukunaga | A61M 16/01 128/911 |
| 2004/0089297 | A1 * | 5/2004 | Videbrink | A61M 16/22 128/203.12 |
| 2005/0247316 | A1 * | 11/2005 | Orr | A61M 16/009 128/205.12 |
| 2007/0004023 | A1 * | 1/2007 | Trachtenberg | B01D 63/026 435/297.2 |
| 2007/0062534 | A1 * | 3/2007 | Fisher | A61M 16/206 128/205.14 |
| 2007/0151561 | A1 * | 7/2007 | Laurila | B01D 69/142 128/203.12 |
| 2007/0193584 | A1 * | 8/2007 | Laurila | A61M 16/08 128/205.27 |
| 2009/0000621 | A1 * | 1/2009 | Haggblom | A61M 16/0081 128/205.12 |
| 2010/0212668 | A1 * | 8/2010 | Flanagan | A61M 16/0833 128/203.16 |
| 2010/0307490 | A1 * | 12/2010 | Broborg | A61M 16/209 128/203.12 |
| 2012/0031402 | A1 * | 2/2012 | Loncar | A61M 16/18 128/203.14 |
| 2014/0102450 | A1 * | 4/2014 | Broborg | A61M 16/105 128/203.12 |
| 2014/0174438 | A1 * | 6/2014 | Schmidt | B01D 53/229 128/203.12 |
| 2015/0250960 | A1 * | 9/2015 | Broborg | A61M 16/0003 128/203.12 |
| 2015/0250976 | A1 * | 9/2015 | Wallin | A61M 16/104 128/202.22 |
| 2015/0314101 | A1 * | 11/2015 | Acker | A61M 16/00 128/203.14 |

FOREIGN PATENT DOCUMENTS

| | | |
|---|---|---|
| WO | 2009062547 A1 | 5/2009 |
| WO | 2014041103 A1 | 3/2014 |
| WO | 2014041104 A1 | 3/2014 |
| WO | 2019117776 A1 | 6/2019 |

OTHER PUBLICATIONS

International Search Report issued in International Application No. PCT/SE2017/051285, mailed Aug. 3, 2018, 3 pages.
Written Opinion issued in International Application No. PCT/SE2017/051285, mailed Aug. 3, 2018, 5 pages.
International Preliminary Report on Patentability issued in International Application No. PCT/SE2017/051285, mailed Jun. 25, 2020, 7 pages.

* cited by examiner

MODULAR BREATHING GAS SEPARATOR UNIT

This application is a U.S. National Stage application of International Application No. PCT/SE2017/051285, which was filed on Dec. 15, 2017. The disclosure of the above mentioned International Application No. PCT/SE2017/051285 is hereby incorporated by reference in its entirety for all it discloses.

TECHNICAL FIELD

The present invention relates to a modular breathing gas separator unit and a breathing system comprising the modular breathing gas separator unit.

BACKGROUND ART

In the field of mechanical ventilation and breathing aids, there are different types of patient breathing systems used to deliver a desired gas mixture to a patient. The breathing system may be of a non-re-breathing or re-breathing type. Re-breathing systems are often used when expensive additive gases are administered to the patient besides the necessary life sustaining gas mixture. In the re-breathing systems exhaled gas is re-supplied to the patient, wherein the additive gas not assimilated by the patient in previous inhalations may be absorbed during the following inhalation. Examples of additive gases are helium, which may be used e.g. in severe cases of asthma, xenon which may be used as contrast medium in diagnostic computer tomography (CT) treatment, and different anesthetic gases which may be used as additive in inhalation anesthesia. Breathing systems are generally discussed for example in WO2014041104, U.S. Pat. No. 8,186,347 and EP2168623.

Breathing systems generally comprise a ventilator, which is connected to a driving gas supply. The driving gas is used to generate patient inhalation and the driving gas may be, for example, oxygen or an air/oxygen mixture. The breathing system further comprises an inspiratory line and an expiratory line connected to the patient. The inspiratory and expiratory lines can be arranged in a closed breathing circuit or circle, also referred to as a patient circuit. A fresh gas supply arrangement is usually connected to the inspiratory line. Furthermore, the breathing circuit may comprise a carbon dioxide absorber. The breathing circuit may comprise check valves, compressors or ejectors to regulate the gas flow to a desired direction. Further, the breathing system suitably comprises an arrangement which separates the driving gas of the ventilator from the patient breathing gases in the patient circuit. The arrangement may be formed for example of a bag in bottle arrangement or an extended pathway extending between the ventilator and the patient circuit.

The breathing gas separator in the breathing system has high demands with regard to patient safety. Thus, the separator should have a robust structure which is easy to handle. Also the material of the separator should be non-toxic, sterilizable and it should tolerate mechanical impacts. Due to these high demands, the separators have often been manufactured of several sub-components which have been assembled together and the manufacturing processes have often been complicated. Furthermore, expensive raw materials have been included in the components. Also, if separators of different sizes have been needed, for example to adapt the breathing apparatus for an adult or an infant, the whole separator has been changed to another separator.

Even though the known breathing gas separators fulfil the requirements regarding patient safety, there is a desire to simplify the structure of the separators while still ensuring patient safety. Furthermore, there is a desire to be able to easily adapt the size of the separator to adult or infant patients while making it possible to use existing breathing apparatuses or systems in a simple way. Also, it is desirable to simplify the manufacturing processes and it is desirable to achieve more economical ways to produce the separator.

SUMMARY OF THE INVENTION

The objective of the present invention is to provide a breathing gas separator unit which overcomes the drawbacks with the existing separators and fulfils the needs mentioned above. Especially it is an objective to provide a breathing gas separator unit with simplified structure while the patient safety demands and requirements are fulfilled.

It is a further objective to provide a breathing gas separator unit which can be used in existing breathing systems and apparatuses in a simple way. Also it is an objective to provide a breathing gas separator unit in which separator devices having different sizes, e.g. a size adapted to an adult or a size adapted to an infant, can be used.

It is also an objective to provide a breathing gas separator unit with simplified and economical structure enabling a simplified manufacturing process.

It is another objective to provide a breathing gas separator unit which may contain disposable single-use components, while the unit has operational robustness.

The objectives above are attained by a modular breathing gas separator unit as defined in the appended claims. Also, the present invention relates to a breathing system comprising the modular breathing gas separator unit.

Especially, the present disclosure relates to a modular breathing gas separator unit for breathing gases, the unit being connectable to a breathing system. The unit comprises a first module comprising a gas separation means adapted to separate ventilator driving gas and patient inhalation and/or exhalation gases, and a second module comprising a carrier means adapted to support and connect the gas separator unit to an interface in the breathing system. By arranging the gas separator unit in different modules, a configurable structure can be obtained. In this way, it is e.g. possible to change only one module in case of operational disturbances.

The carrier means suitably has an outer shape corresponding to a shape of the interface in the breathing system. In this way, the carrier means may be fitted to the breathing system interface independent of the size and shape of the separation means.

The carrier means may comprise a base and a sidewall arranged to surround the gas separation means, and optionally a detachable cover. In this way, the gas separation means may be protected against outside forces and/or contaminants.

The sidewall may comprise connecting means arranged to connect gas delivery lines to the separation means. Thus, a configurable breathing gas separator unit may be provided.

The base may comprise openings through which liquid can pass. In this way liquid is not accumulated in the base e.g. during washing and cleaning of the base and more hygienic structure is provided.

According to an embodiment, the base of the carrier means may comprise a track defining a shape for a gas duct. The track is suitably adapted to receive a flexible gas tube arranged to convey the breathing gases. The carrier means may further comprise a detachable cover. In this way, the flexible tube may be held firmly in place, while it is easy to replace with a new one after use. Thus, a simple structure for a single use gas separation means is provided.

The separation means is suitably a volume reflector body comprising a single gas duct comprising curved portions. By having curved portions in the gas duct, the length of the gas duct can be increased while it still fits to the carrier means.

According to an embodiment, the volume reflector body may have an integrated one-piece molded structure. Alternatively, the volume reflector body may comprise two molded portions welded together to form a one-piece structure. By providing a molded structure which does not require assembly and use of connecting devices, a simple and lightweight structure of the volume reflector body can be provided.

The gas duct may be arranged such that at least two gas duct sections are located adjacent to each other and connected to each other by means of at least one solid portion. By placing gas duct portions adjacent to each other, the length of the gas duct may be increased. The gas duct may comprise at its respective free end a first port and a second port comprising means to connect the component to the breathing system. Thus, the component may be connectable to various other components of the breathing system.

According to an embodiment, the gas duct resembles a shape of a folded tube such that the free ends of the tube are placed adjacent to each other and wherein the at least two adjacent gas duct portions run side-by-side, and wherein the tube is spirally wound inwards towards a centre point of the modular breathing gas separator unit. In this way, an increased gas duct length may be provided while the uptake area of the component will be minimized. The folded end of the tube may be arranged such that two central loops are formed in the centre portion of the component. In this way sharp folding edges can be prevented and the gas may be smoothly conveyed in the gas duct.

The carrier means may comprise mechanical locking means arranged to lock the volume reflector body to the carrier means. The locking means may comprise quick coupling means, such as bayonet coupling or hooking means, such that each of the carrier means and the separation means comprises a mating part of the locking means. The mating parts may be located in the carrier and the separation means at pre-determined positions. The locking means is suitably size independent. Thus, accidental removal of the volume reflector body from the carrier means is prevented.

The length of the gas duct may be from 0.5 to 4 m. The total gas duct volume may be from 0.1 to 2 litres. Thus, different sizes of the volume reflector body to fulfil different patient requirements may be provided in an easy and effective way.

According to a further embodiment of the present disclosure, the separation means may be a bag-in-bottle device, wherein the carrier means comprises a base, sidewalls and a cover arranged to surround the gas separation means in the form of a bag in an airtight manner. In this way the carrier means with the cover form a part of the device corresponding to a bottle of a conventional bag-in bottle device. Also, in this way the breathing gas separator unit may be constructed in a more space-saving manner than traditional bag-in-bottle arrangements.

According to another embodiment, the gas separation means may comprise a first gas bag and a second gas bag. Each of the bags may comprise a valve means or a connector to a valve means, which valve means is arranged to release or receive breathing gas or driving gas. The first bag is suitably arranged to receive breathing gas when the second bag is arranged to release driving gas and vice versa. In this way a simple structure for the gas separation means can be provided. Suitably, the first bag and the second bag are not fluidly connected.

According to a variant, the modular breathing gas separator unit may be connectable to the breathing system by means of insertion into the interface in the breathing system. Thus, the unit may be connected to the breathing system in a space saving manner.

The carrier means may comprise locking means to lock the modular breathing gas separator unit to the interface in the breathing system. The locking means may be a mechanical docking interface arranged to lock the modular breathing gas unit to the interface in the breathing system. Thus, the unit can be secured into the breathing system in a safe manner.

At least one of the gas separation means and the carrier means may be made of plastic material. In this way, a light-weight unit may be provided. The gas separation means and/or the carrier means made of the plastic material may be manufactured by means of blow-molding. In this way, integrated one-piece molded structures having uniform material characteristics throughout the whole component can be obtained in a simple and effective way.

At least one of the gas separation means and the carrier means may be disposable. This means that the module may be discharged after use and thus, that the module is a single use module.

The present invention also relates to a breathing system comprising a ventilator providing a driving gas flow, a patient circuit comprising inhalation and exhalation lines connectable to a patient, a fresh gas supply inlet connectable to the inhalation line, an interface adapted to receive the modular breathing gas separator unit as defined above.

BRIEF DESCRIPTION OF THE DRAWINGS

The invention will be described more in detail with reference to the appended drawings in which.

DETAILED DESCRIPTION

According to the present disclosure, the breathing gas separator unit is connectable to a breathing system. By breathing system is meant all components and devices included in the system to deliver a desired gas mixture to a patient. The breathing system may for example comprise an enclosure including the breathing gas separator unit, electronic injection vaporizers, $CO_2$ absorber, control device and screens for monitoring and controlling the system and additional devices needed for the breathing system in question. By being connectable is meant that the unit can be directly or indirectly connected to the breathing system, e.g. to the enclosure.

Figure 1:
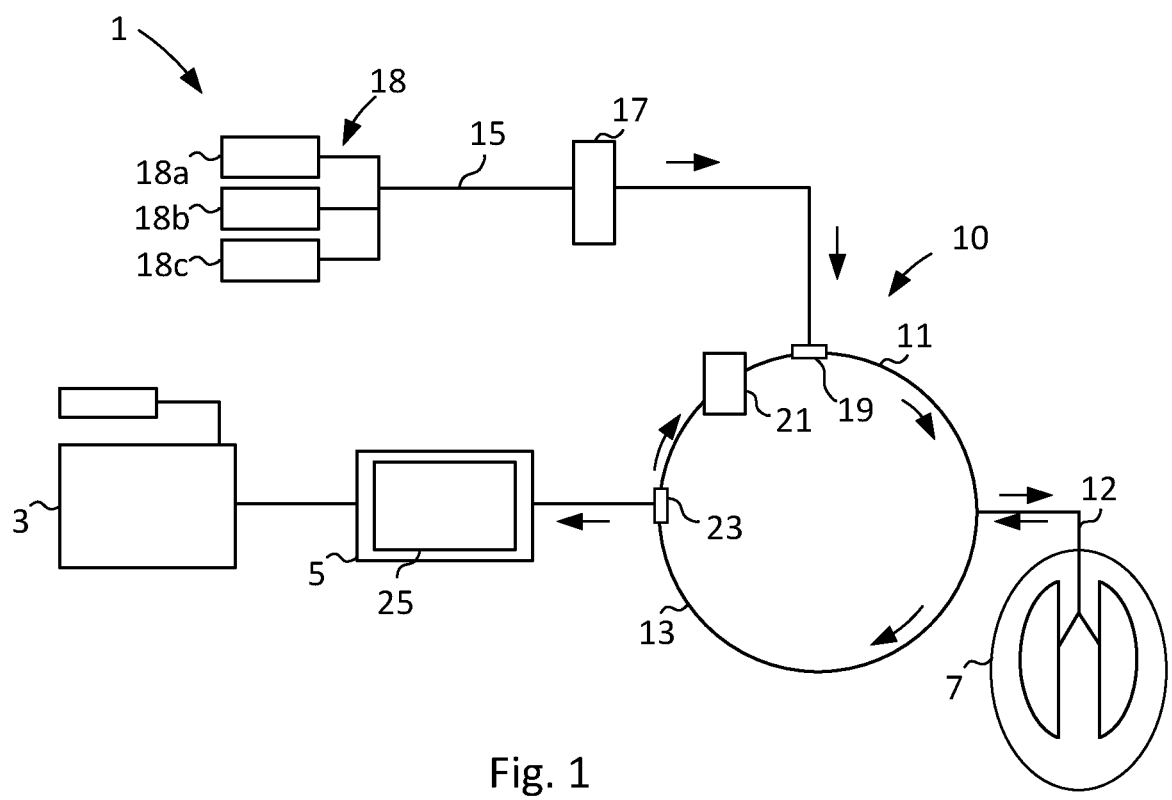
FIG. 1 schematically illustrates a breathing system comprising a modular breathing gas separator unit of the present disclosure.

According to the present disclosure, the modular breathing gas separator unit may be used in different types of breathing systems adapted to provide a breathing gas to a patient. The breathing system may be a re-breathing system in which exhaled gases are returned to a patient. An example of a breathing system is schematically shown in FIG. 1. Examples of the modular breathing gas separator unit is shown in FIG. 2-9.

The breathing system is generally depicted by reference number 1 in FIG. 1. The breathing system 1 comprises a ventilator 3, which generates a gas flow in the breathing system 1. A ventilator 3 is fluidly connected to a patient circuit 10 comprising an inspiratory line 11 and an expiratory line 13 which are connected to a patient depicted by reference sign 7. The patient circuit 10 is adapted to convey inhalation and expiration gas to and from the patient 7, and comprises several components comprising hollow gas ducts, such as rigid and flexible tubes, check valves and other components necessary to control the gas flow in the breathing system.

A Y-piece 12 and a patient interface (not shown) are usually used to fluidly connect the inspiratory line 11 and the expiratory line 13 of the patient circuit 10 to the patient 7. The interface may include different components such as, but not limited to, larynx tube, tracheal tube, mask etc. The inspiratory line 11 is connected to a fresh gas supply line 15 through which a fresh patient gas mixture is supplied to the patient. The patient gas mixture may comprise several gases supplied via different gas modules 18a, 18b and 18c adapted to deliver desired gases to the breathing system. Each of the gas modules may comprise a gas regulating valve, pressure and flow measuring devices and electronic devices to control the flow. For example, the first gas module 18a may be adapted to supply nitrous oxide ($N_2O$), the second gas module 18b may be adapted to supply air and the third gas module 18c may be adapted to supply oxygen ($O_2$) to the patient circuit 10. Additionally, an anesthesia agent, e.g. halothane, enflurane, isoflurane, sevoflurane, and/or desflurane, may be supplied to the patient gas mixture from a vaporizer 17.

In the illustrated example, the gases are collected in a manifold 18 in which the gases are mixed and the gas is conveyed via the fresh gas supply line 15 to the inspiratory line 11 in the patient circuit 10. Optionally, the vaporizer 17, which may be an electronic injection type vaporizer, is connected to the fresh gas supply line 15 downstream of the manifold 18 and upstream of a fresh gas inlet 19 connecting the fresh gas supply line 15 to the inspiratory line 11.

When the expiratory gases are to be re-breathed, they are returned to the inspiratory line via a carbon dioxide absorber 21 before the gas is returned to the patient. The flow direction of the expiratory and inspiratory gases can be regulated for example by means of check valves, compressors, fan ejectors or any other means that can regulate the flow direction.

Figure 9:
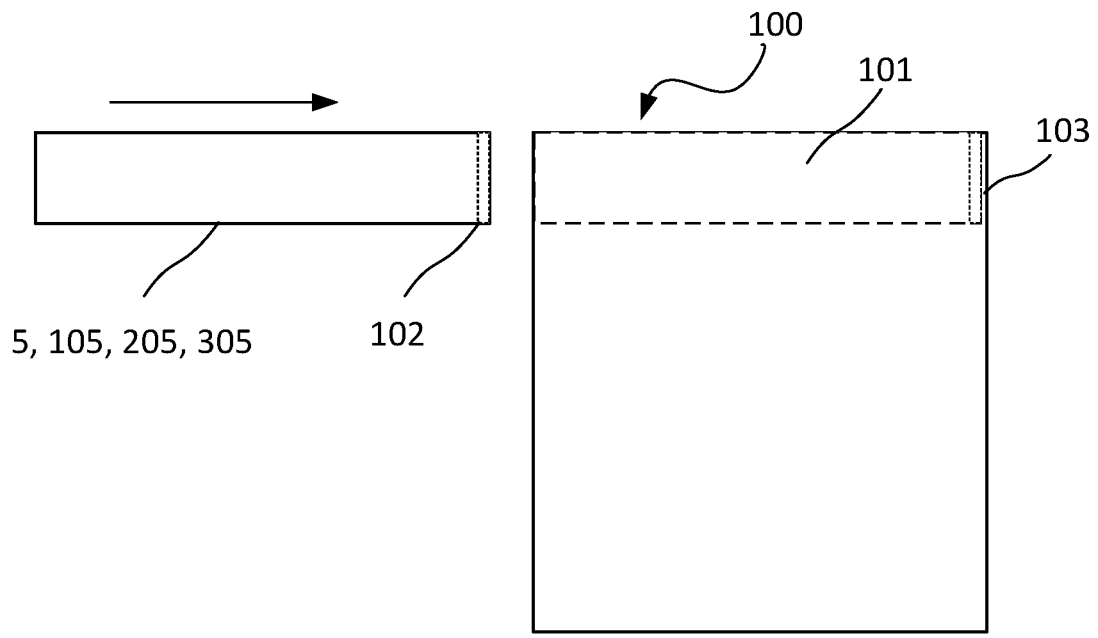
FIG. 9 schematically illustrates the modular breathing gas separator unit and breathing system unit comprising a connecting interface.

The breathing system 1 comprises also a modular breathing gas separator unit 5 by which the driving gas of the ventilator 3 is separated from the patient breathing gases flowing in the patient circuit 10. The ventilator 3 is connected to the patient circuit 10 by means of a ventilator inlet 23, and the separator unit 5 is arranged in between the ventilator 3 and the ventilator inlet 23. The separator unit 5 according to the present disclosure is a modular breathing gas separator unit and different embodiments are described more in detail below. For example, the modular breathing gas separator unit may comprise a volume reflector body 25 corresponding to a gas separation means adapted to separate ventilator driving gas and patient inhalation and/or exhalation gases and thus a first module of the modular breathing gas separation unit 5. The unit comprises also a second module comprising a carrier means 27 in the form of a tray or a carrier adapted to support and carry the volume reflector body 25 (see FIGS. 2 to 4) and also connect the gas separator unit to an interface in the breathing system, as shown in FIG. 9.

Figure 2:
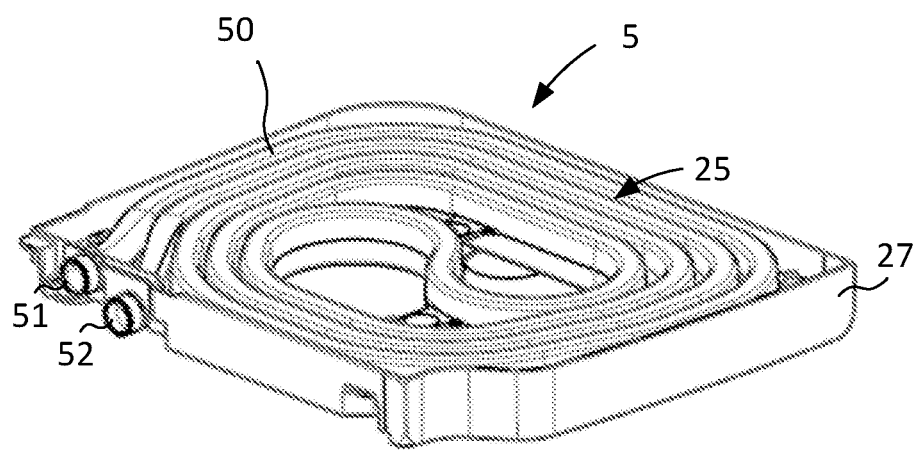
FIG. 2 schematically illustrates an example embodiment of a modular breathing gas separator unit of the present disclosure in a perspective view from above.
Figure 3:
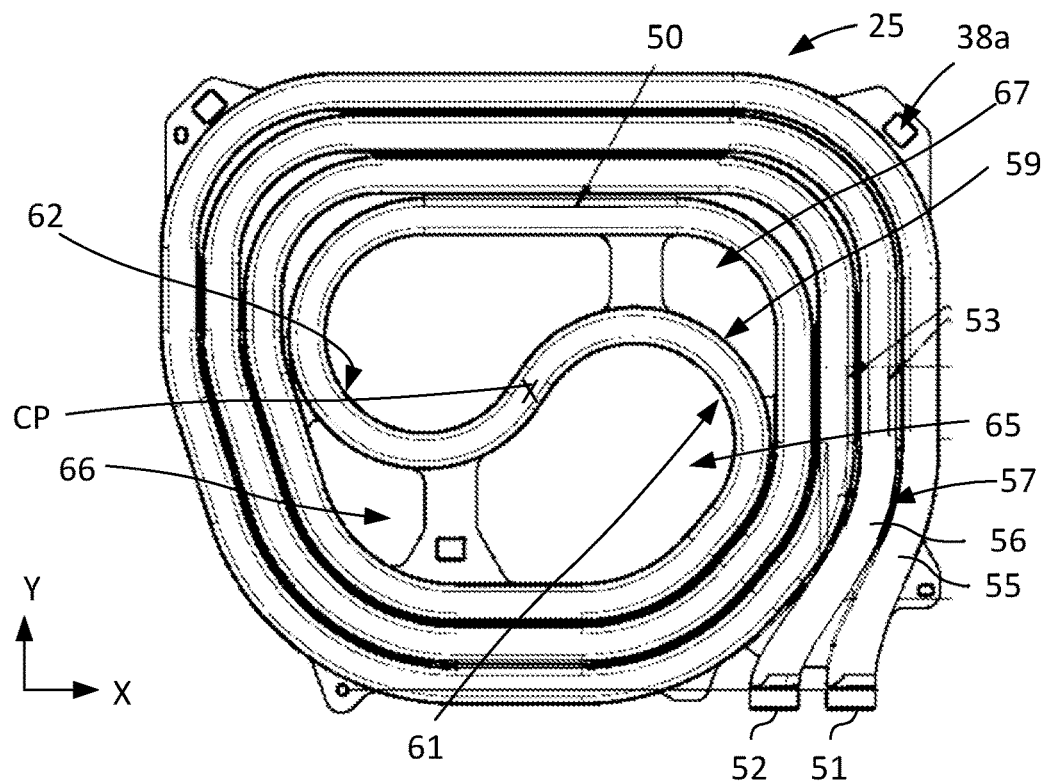
FIG. 3 schematically illustrates an example embodiment of a breathing gas separation means of the present disclosure from below.
Figure 4:
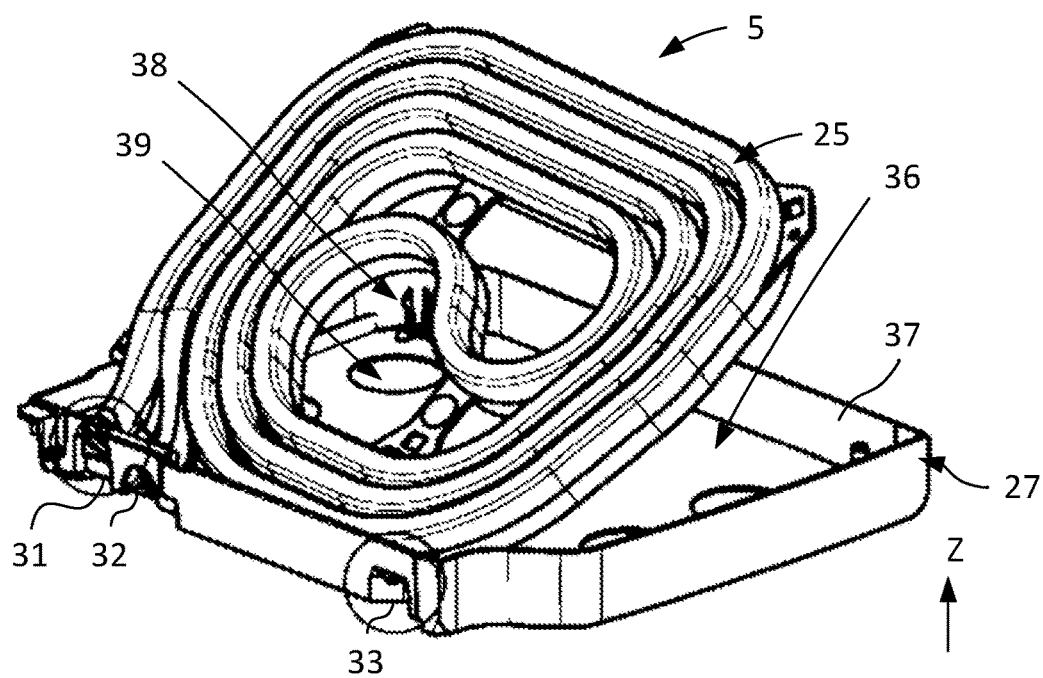
FIG. 4 schematically illustrates an example embodiment of mounting of the breathing gas separation means to a carrier means in a perspective view.

Reference is made to FIG. 2-4 in which an embodiment is shown comprising the first module comprising a gas separation means adapted to separate ventilator driving gas and patient inhalation and/or exhalation gases in the form of a volume reflector body 25. The volume reflector body 25 fluidly separates the patient circuit 10 from the ventilator 3. The separation is an open separation, i.e. without any separating means such as membranes, in which the two adjacent gas fronts are comprised, and wherein the driving gas and the expiratory/patient gases are separated. The volume reflector body 25 comprises a gas duct 50 adapted to separate said gases. The separation can be obtained by arranging the length of the gas duct 50 sufficiently long so that it is able to separate the driving gas and the expiratory gases and may comprise curved sections as further described below. The gas duct 50 provides a continuous gas duct between the ventilator driving gas supply and the patient circuit 10. The separation of the ventilator gas and the breathing gas is made with a gas gradient reciprocating in the gas flow channel 50 in a known manner whereby diffusion of driving gas and patient gas may occur. During inhalation the driving gas supply from the ventilator 3 pushes the inspiration gas towards the patient 7 and to the inspiration line 11 of the patient circuit 10. During expiration, the expiration gas is brought towards the volume reflector, whereby pressure may be released from the reflector unit 5. Thus, the volume reflector unit 5 is adapted to perform the same function as a bag-in-bottle system, thus providing a temporary gas reservoir that receives exhaled breathing gases during the expiration phase and that pushes back the breathing gases during the next inspiration phase.

Generally, the reflector body comprises a hollow gas duct for conveying an inspiratory gas to a patient. The patient circuit is allowed to use the reflector body volume, i.e. the gas duct of the reflector body, for a driving gas pillar, which virtually moves back and forth in the reflector volume. The reflector volume is cyclically filled with previously exhaled gas, e.g. comprising an anesthetic gas, which is returned to a patient circuit for re-use, i.e. re-breathing, during a subsequent inspiration. The driving gas of the volume reflector, usually oxygen or air, is used as the driving gas pillar pushing the patient gas pillar back into the patient circuit towards the patient during inspiration. Upon the subsequent expiration, the reflector volume is re-filled with expiratory gas and the driving gas pillar is pushed out of the reflector volume towards a gas evacuation system, EVAC. EVAC is usually present in operating theatres and connected to the exhaust of anesthesia machines for taking care of waste gases to avoid anesthetic gases escaping into the surrounding environment. In this manner an adjacent patient gas pillar is alternatingly virtually moving out of the patient circuit into the reflector volume during exhalation, and back into the patient circuit via the carbon dioxide absorber from the reflector volume during inspiration.

Returning to FIG. 2-4, the volume reflector body 25 and the gas duct 50 thereof have a fixed and pre-determined volume. The reflector body may have an integrated one-piece molded structure and is suitably made of a non-toxic plastic material. Alternatively, the reflector body may be molded in two parts, which are welded together. The reflector body suitably has a size and shape which enables it to be fitted into e.g. an existing breathing apparatus. Also, the gas duct 50 can be cyclically filled with the driving gas and the expiratory gas without mixing or with minimized mixing of the gases. The volume of the gas duct may be arranged to be suitable for the patient in question, e.g. for an adult or infant patient. The size of the carrier means may be the same for all reflector body sizes, whereby it is possible to fit the reflector body to an existing apparatus regardless of the size or volume of the reflector body.

The gas duct 50 of the reflector body 25 comprises at its respective free end a first port 51 and a second port 52. The respective port 51, 52 may comprise means to connect the component to the breathing system 1, i.e. to a line conveying driving gas from the ventilator and to a line conveying expiratory gas from the patient. The carrier means 27 may comprise openings or recesses for ports 51 and 52. In the shown example, the patient circuit 10 is fluidly connected to the second port 52, such that the expiratory gas can be received during expiration via the second port 52 while gas in the volume reflector 5 is pushed through the first port 51 as a waste gas flow to an exhaust of the breathing system. The driving gas from the ventilator 3 is connected to the first port 51 and during inspiration the driving gas pillar pushes the patient gas pillar back into the patient circuit 10. Expired gas from a preceding expiration is thus re-breathed by the patient in subsequent inspiration from the modular breathing gas separator unit 5.

The volume reflector body 25 may be designed in various ways in order to provide a well-defined gas front, and the gas duct 50 or tube of the volume reflector is preferably chosen to be narrow. However, this dimension may be weighed against increased flow resistance. Also, compressible volume is chosen to be as low as possible. The gas duct may have a substantially circular cross-section or it may be rectangular with rounded corners or it may be oval or nearly oval. The area of the cross section perpendicular to the flow direction can be from 200-500 mm$^2$, suitably from 300-400 mm$^2$. The length of the gas duct may be for example from 0.1 to 4 m and can be adapted to the patient in question, e.g. an infant or an adult. Likewise, the total volume of the gas duct may be adapted to the patient in question, e.g. an infant or an adult and can be for example from 0.1 to 2 litres or from 0.2 to 1.5 litres, preferably from about 1.0 to 1.5 litres. In some embodiments, for example in case of neonatal infants (neo) having as low tidal volume as 15 to 20 ml, the volume of the volume reflector may be adapted to these small tidal volumes. In addition, instead of providing a gas duct having a volume slightly larger than the patient tidal volume, the modular gas duct component may be replaced with a carbon reflector having a volume smaller than the patient tidal volumes. Examples of carbon reflector technology can be found in U.S. Pat. Nos. 5,471,979A and 8,640,703A.

The hollow gas duct 50 may be a single continuous gas duct comprising straight and curved portions. The hollow gas duct 50 may be arranged such that at least two gas duct sections are located adjacent to each other. The sections may be connected to each other by means of at least one solid portion between the sections.

The volume reflector body 25 has an outer extension defined by the outer edges of the reflector body. The outer edges may define in an X-Y plane a shape resembling approximately a quadrilateral shape with rounded corners. By substantially quadrilateral shape is meant a principal shape of the component in an X-Y plane. Also quadrilateral shapes in which at least one, two, three or four edges have rounded shape are included in the definition. Also, the length of the sides in the quadrilateral shape may be the same or different. The shape is not limited thereto, and it could be substantially circular, oval or rectangular, preferably comprising at least one rounded corner. By a shape resembling approximately a quadrilateral shape with rounded corners design it can be easily fitted into existing equipment. The reflector body 25 may be fitted to a carrier means 27 also having an inner shape resembling the shape of the reflector body 25. It can thus be a quadrilateral shape with at least one rounded edge. The carrier or carrier means may thus comprise a cavity for carrying or housing the reflector body and the carrier may comprise side walls at least partially surrounding the reflector body. Thus, the carrier protects the reflector body and is adapted for keeping the reflector body in its position.

The X-Y plane is defined as a two-dimensional plane when the reflector body/carrier means is viewed directly from above or below, and the plane is shown in FIG. 3, in which the reflector body 25 is shown from below. A Z-plane is defined as a plane transversal to the X-Y plane and showing the height dimension of the reflector body/carrier means when the reflector body/carrier means is viewed from the side, and the Z-plane is shown by an arrow in FIG. 4.

Reference is made to FIG. 3 which shows an example embodiment of the volume reflector body 25 from below, the hollow gas duct 50 of the reflector body may be arranged so that it has a gas duct 50 shape resembling a shape of a folded tube. The gas duct 50 has a substantially rectangular cross section with rounded corners as indicated by reference numbers 53. The gas duct 50 may be folded such that the free ends comprising a first port 51 and a second port 52 of the duct are placed adjacent to each other and the at least two adjacent gas duct portions 55, 56, in proximity of respective free end, run side-by-side. The free ends of the tube are placed in a parallel manner in the X-Y plane. The shape of the reflector body 25 resembles a shape in which the duct 50 is spirally wound inwards towards a centre point CP of the reflector body. The folded end 59 of the gas duct is arranged such that two central loops 61 and 62 are formed in the centre portion of the quadrilateral shape. The duct sections running in parallel, i.e. the sections 55 and 56, may be connected to each other by means of a solid portion 57 arranged in between the sections. The folded end portion of the gas duct may be formed so as to define the loop portions 61 and 62 and so that openings 63 and 65, which are through holes when viewed in X-Y plane, are formed. The reflector body may optionally comprise at least one additional through hole 66, when viewed in X-Y plane. The embodiment shown in FIG. 3 comprises a further through hole 67. In this way, a lighter construction for the reflector body can be obtained.

In an alternative embodiment, the free ends comprising the first port and the second port of the duct can be placed in a manner where they are not adjacent to each other. For example in an alternative embodiment, in a similar manner as in the embodiment shown in FIG. 6, the gas duct could be arranged in wave-form and so that the free ends of the duct are not arranged adjacent to each other, but instead at opposite ends of the wave-formed gas duct. Thus, the shape of the volume reflector body could correspond to the shape of the embodiment shown in FIG. 6, which is defined more in detail below.

As illustrated in FIG. 4, the reflector unit 5 comprises the reflector body 25 and a carrier means 27, which has a shape and size adapted to keep the reflector body in place during the operation of the breathing apparatus. The carrier may have a standard size while the size and shape of the reflector body 25 may vary. The carrier may comprise mechanical locking means 38 arranged to lock the volume reflector body to the carrier means. The locking means may comprise quick coupling means, such as bayonet coupling or hooking means, such that each of the carrier means and the separation means comprises a mating part of the locking means. In the illustrated example, the locking means 38 comprises two pins extending in the Z-direction. The upper part of each pin has a larger extension than the lower part of each pin. The pins are flexible and can be pushed into a mating part 38a shown in FIG. 3 of the volume reflector body. The locking means 38 and the mating part 38a are located at pre-determined positions and the locking means is suitably size independent. Thus, accidental removal of the volume reflector body from the carrier means is prevented, despite of the size of the volume reflector body.

As further shown in FIG. 4, the carrier means 27 comprises a base 36 and a side wall 37. The base 36 comprises at least one opening 39 through which liquid can pass when the carrier means is cleaned.

Figure 5:
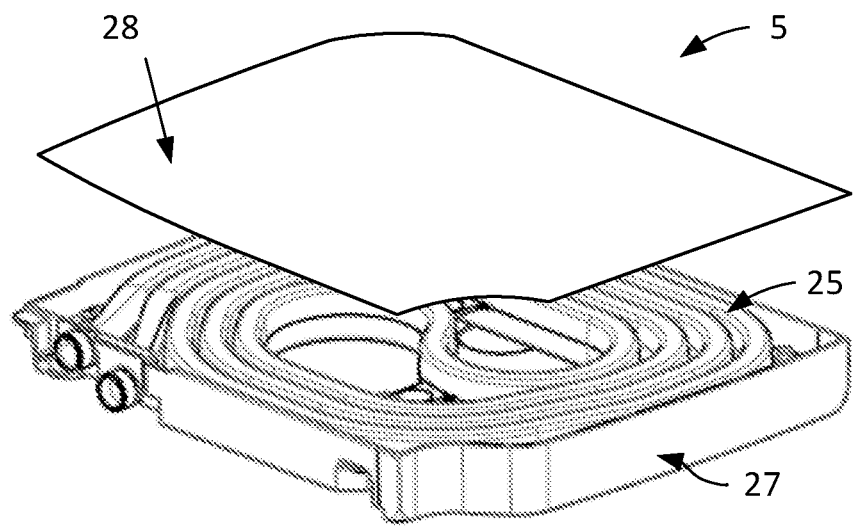
FIG. 5 schematically illustrates the example embodiment of FIG. 2 with a detachable cover in a perspective view seen from the above.

The carrier means 27 also comprises openings 31 and 32 for respective ends 51 and 52 of the gas duct 50. The carrier means 27 may comprise additional opening 33 arranged to receive different connectors, sensors or devices. The opening may be formed as a cavity or recess, and is adapted to receive different connectors, sensors or devices from the breathing system. Generally, the carrier means may be made of a dimensionally stable material, such as plastic or metal, e.g. aluminium, but preferably plastic. Further, as illustrated in FIG. 5, the breathing gas separator unit 5 may comprise a cover 28. The cover 28 may be detachable. It may be arranged also such that it closes the unit 5 in an airtight manner.

Figure 6:
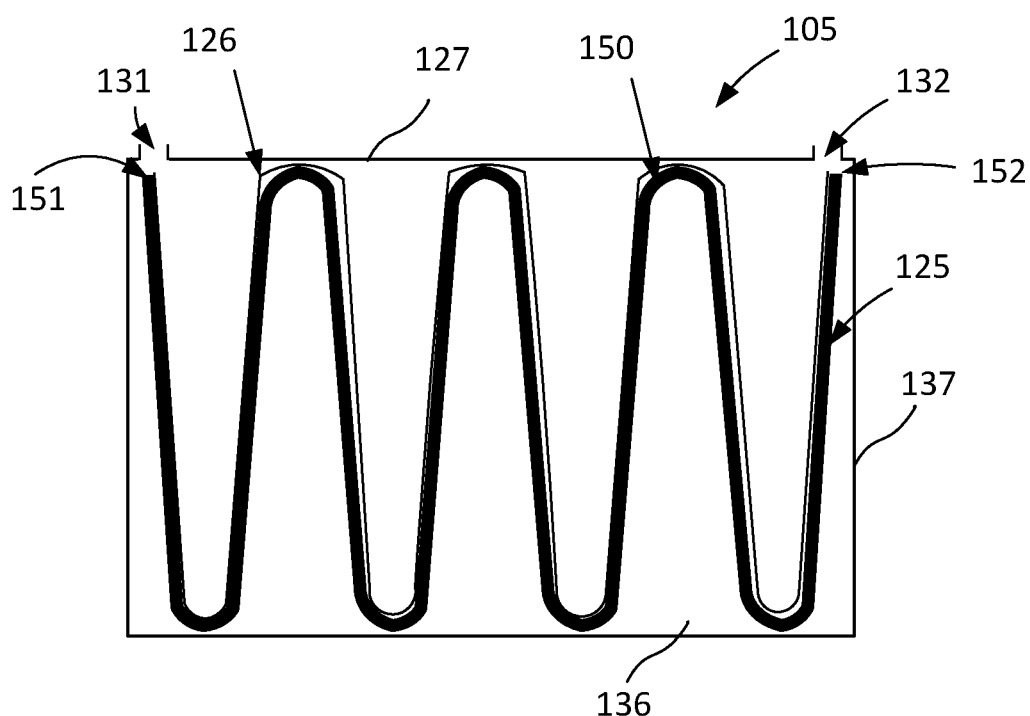
FIG. 6 schematically illustrates an example embodiment of a breathing gas separation means and a carrier means from above.

In FIG. 6 another embodiment of the modular breathing gas separator unit, depicted with reference sign 105, is shown. In this embodiment, the base 136 of the carrier means 127 comprises a track 126 defining a shape of a gas duct 125. The track 126 is adapted to receive a flexible gas tube 150 arranged to convey the breathing gases. The carrier means 127 of the embodiment in FIG. 6 may have several tracks or clips for receiving various lengths of the flexible tube in order to adapt to the tidal volume of different patient categories, i.e. for example adult, child, neo as also described in connection with the previous embodiments.

A detachable cover of the type shown in FIG. 5 is suitably included in the unit 105. Similar to the embodiment shown in FIG. 2-4, the carrier means 127 also comprises openings 131 and 132 for respective ends 151 and 152 of the flexible gas tube 150. The carrier means 127 may comprise additional opening arranged to receive different connectors, sensors or devices, and may have the same features as defined in connection with the embodiment in FIG. 2-4. Thus, for example, the carrier means 127 may be made of a dimensionally stable material, such as plastic or metal, e.g. aluminium, but preferably plastic and may be disposable or re-usable.

Figure 7A:
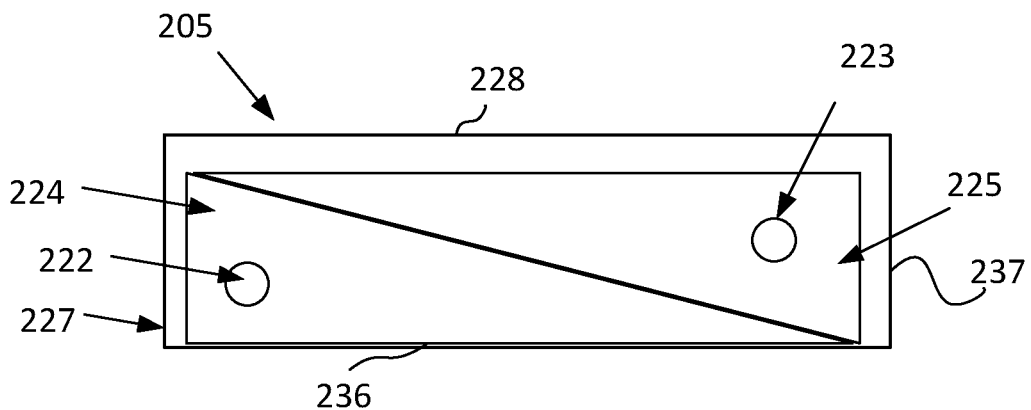
FIG. 7a-7c schematically illustrate operation phases of an example embodiment of a breathing gas separation means and a carrier means seen from the side.
Figure 7B:
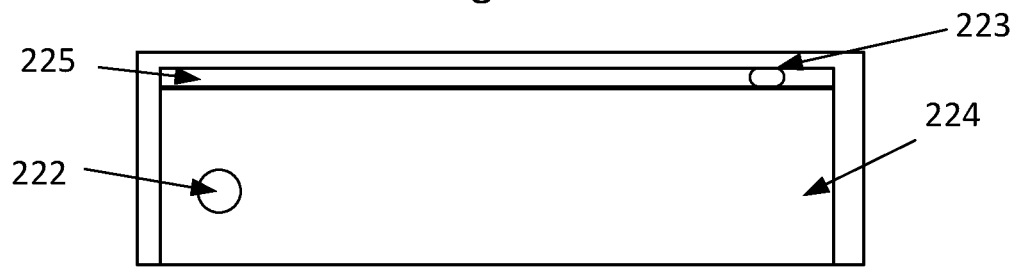
Figure 7C:
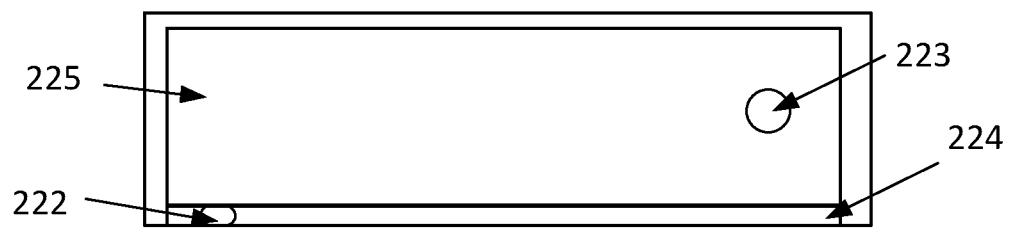

A further embodiment according to the present disclosure is shown in FIGS. 7a, 7b and 7c. In FIG. 7a the principal structure of the modular breathing gas separator unit 205 according to this embodiment is shown. The first module comprises a gas separation means which comprises a first gas bag 224 and a second gas bag 225. Each bag 224 and 225 may comprise a respective connector 222, 223 to a respective valve means or a valve means, configured to release breathing gas to or receive breathing gas from the respective bag.

The operation of unit 205 is similar to the operation of a standard bag in bottle arrangement. The first bag 224, connected to patient circuit 10, receives the exhaled breathing gas via connector 222. The exhaled gas will be introduced into the first bag 224 if the patient produces a pressure equal to or higher than the pressure at the expiratory valve (PEEP valve). Simultaneously, driving gas in the second bag 225 connected to the driving gas line is pushed out from the second bag 225 via a connector 223 to ambient air or EVAC. The pressure in the patient circuit 10 is controlled by the pressure at the expiratory valve.

During inspiration, the expiratory valve is closed and driving gas from the driving gas valve is pushed into the second bag 225 via the second connector 223. The second bag 225 will exert a pressure on the volume of gas contained in the first bag 224 pushing it back into the patient circuit 10 via the first connector 222.

Figure 8:
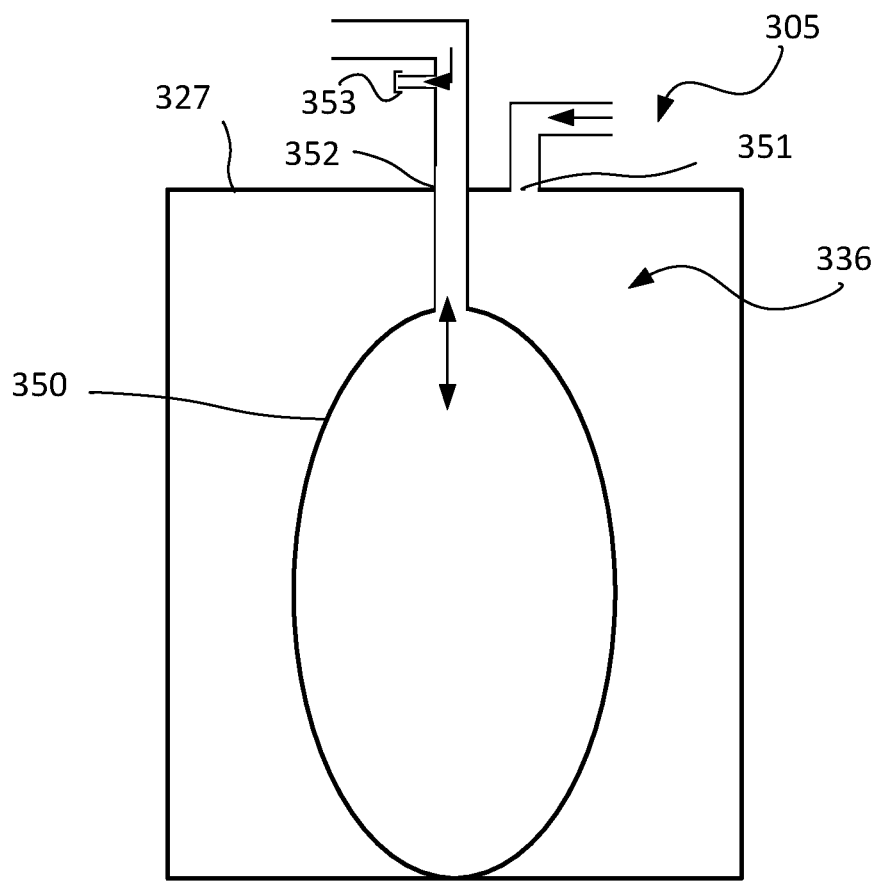
FIG. 8 schematically illustrates a further example embodiment of a breathing gas separation means and a carrier means seen from the above.

As with a bag in bottle arrangement, excess gas in the first bag 224 connected to the patient circuit 10 can be arranged to exit via e.g. a pop-off valve as can be seen in FIG. 8.

The bags may be made of non-toxic plastic material. The first bag and the second bag are not fluidly connected. The bags may be adapted for single use. The second module comprises a carrier means 227 adapted to support the bags. The carrier means 227 may correspond to the carrier means defined in connection with FIG. 2-4 and may have a size and shape as defined therein. The carrier means comprises a base 236, a side wall 237 and optionally a detachable cover 228. The cover can be omitted if the breathing gas separator unit is place in an enclosure which covers the bags during operation. The carrier means may be made of a dimensionally stable material, such as plastic or metal, e.g. aluminium, but preferably plastic and may be disposable or re-usable.

A further embodiment of the present disclosure is shown in FIG. 8, a traditional bag in bottle arrangement adapted for the modular concept. The embodiment is viewed from the above.

The unit 305 comprises a first module comprising a gas separation means in the form of an expandable bag 350, e.g. the schematically shown bellows. The bellows 350 is connected to the patient circuit for receiving and returning exhaled patient gas from/to the patient circuit.

A second module, the carrier means 327 comprises a base 336 and sidewalls (not shown) arranged to surround the bellows 350, and a detachable cover (not shown) which is adapted to close the unit in an airtight manner forming an airtight compartment. The compartment is connected to the ventilator driving gas via the port 351.

The gas separation unit 305 is configured so that it can be connected to an interface 101 in the breathing system further described in connection with FIG. 9.

During the inhalation phase, an expiratory valve (not shown) is closed and the driving gas is fed from an inspiratory valve (not shown) to the compartment via the first port 351. The driving gas exerts a pressure onto the bag 350 and the breathing gas contained therein, pushing the gas back into the breathing circuit.

During the exhalation phase, the bag 350 receives the exhaled breathing gas from the patient circuit via a second port 352. The inspiratory valve is closed and the expiratory valve regulates the expiratory pressure. The exhaled gas will be received into the bag 350 if the patient produces a pressure equal to or higher than the pressure at the expiratory valve. The pressurized bag 350 exerts a pressure in the compartment 326 and the contained driving gas is pushed out of the compartment to the expiratory valve via the second port 352.

Any excess air in the breathing circuit may be released via a valve 353, a so called pop off valve. The unit may further comprise a further carrier means adapted to support and connect the gas separator unit 305 to an interface in the breathing system.

FIG. 9 illustrates how any one of the above described embodiments of the modular breathing gas separator unit 5, 105, 205 or 305 according to the present disclosure is connectable to the breathing system 1. The breathing system may comprise a breathing system enclosure 100 comprising an interface 101. The modular breathing gas separator unit 5, 105, 205 or 305 can be for example connected by means of insertion into the interface 101, as shown by the arrow in FIG. 9. Suitably the carrier means of the unit 5, 105, 205 or 305 has an outer shape corresponding to a shape of the interface in the breathing system. The carrier means of the unit 5, 105, 205 or 305 may comprise a mechanical docking interface 102 arranged to lock the modular breathing gas unit 5, 105, 205 or 305 to the interface 101 in the breathing system. The interface may include a mating portion 103 adapted to receive the docking interface 102 of the unit.

The breathing system may comprise further components, e.g. controlled inspiratory or expiratory valves, check valves, flow sensors, pressure sensors, tubes and connectors. The tubes may be rigid or flexible and contain a hollow gas duct adapted to convey gas in a breathing system. For example, the inspiratory and expiratory lines may be rigid tubes, while the Y-piece may be flexible, or vice-versa, or in some embodiments, they could all be flexible or rigid.

The modules of the modular breathing gas separator unit for breathing gas, such as the reflector body defined above, may be produced by means of molding. Any kind of plastic molding process may be used, for example blow molding. By blow molding is meant a process for forming plastic objects in which a plastic material, i.e. a thermoplastic polymeric raw material, is melted, put in a mold, and then shaped by having compressed air blown into it. In one variant of the process, the plastic material can be melted down and then pre-formed to an initial form, which is often referred to as a pre-form or a parison. The parison comprises at least one opening through which gas, e.g. air, can pass. The parison is then clamped into a mold and compressed air is blown into the structure and thus the polymeric material is pressurized. In this way the thermoplastic polymeric material is pressed towards the contours of the mold resembling the final shape of the breathing system component, e.g. the reflector body. After a pre-determined or desired blowing of the compressed air, the material is allowed to cool down and harden or cure. Subsequently, the mold is opened and the reflector body is removed or automatically ejected by means of an ejection device from the mold. The reflector body may be additionally cut to remove excess material.

Figure 10:
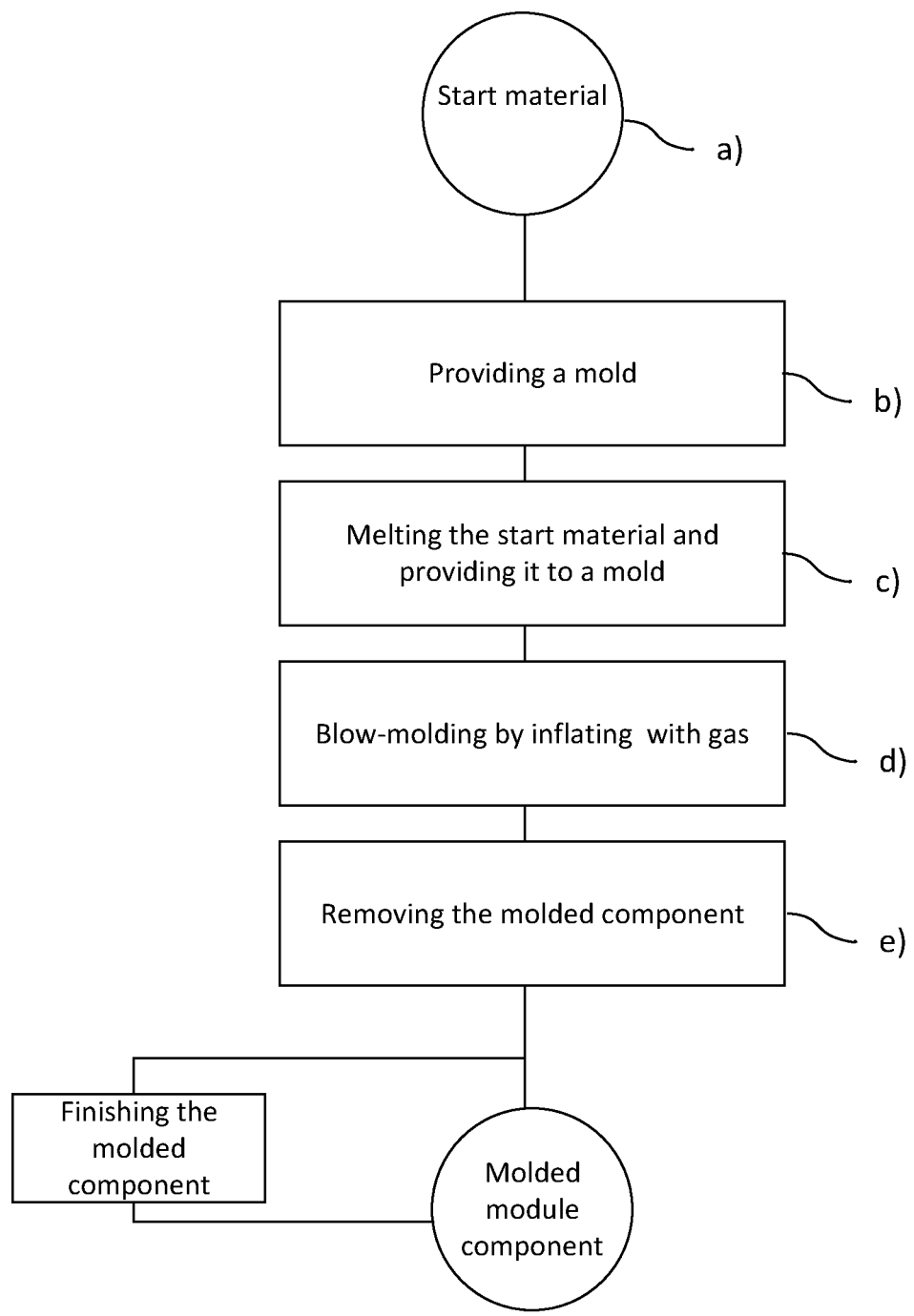
FIG. 10 illustrates the steps of an example manufacturing process according to the present disclosure.

Reference is made to FIG. 10 showing an example of a manufacturing process in the form of a flow chart.

In step a) a non-toxic plastic material for the component is provided. The material is suitable for blow-molding.

In step b) a mold is provided. The mold comprises a cavity having a shape corresponding to the shape of outer contours of the module of the breathing system separator unit.

In the next step c) the non-toxic plastic material is melted and a parison of the molten plastic material is formed. A parison is a hollow tube consisting of the moldable material which is blow-molded in the subsequent step d). The parison may be provided for example by means of extrusion or injection molding, e.g. by melting the plastic material in an extruder and by pressing the material through a nozzle to form the parison. The material in the parison is viscous and rubbery, the grade of which is dependent on the MFR-value of the material.

In step d) the module is blow molded by means of inflating the melted plastic material or the parison with pressurized gas so that it is pressed towards the walls of the cavity in the mold.

In the final step e) the mold is opened and the blow-molded module is removed. The component is finally cured either in the mold or after removal from the mold. The blow-molding process may be performed in existing blow-molding systems. Additionally, the process may comprise cutting the blow molded module to remove excess material surrounding the edges of the component. Also other steps may be included to obtain a desired final shape or surface features of the module. For example in a process where the manufactured module comprises two free gas duct ends, the process may comprise a step of machining the free ends to provide sealing surface for additional components.

The plastic material is suitably a non-toxic plastic material, so that it can be used in fluid contact with a patient. Also the plastic material may be chosen so that patient gases comprising e.g. anesthetic agents are not absorbed or adsorbed by the material. This is important in case the gas separation means is re-used in a breathing system. The component may be adapted to withstand cleaning and/or sterilization before it is taken into use in breathing systems due to different requirements in different hospitals and countries. The modules of the breathing gas separator unit may be single-use or re-usable.

The features of the embodiment defined above may be combined. For example, the carrier means presented in connection with FIG. 2-4 may be used in connection with the embodiments shown in FIGS. 6 and 7a-7c. The scope of the disclosure is not limited by the examples above, but by the scope defined by the appended claims.

The invention claimed is:

1. A modular breathing gas separator unit for breathing gases, the gas separator unit connectable to a breathing system comprising a ventilator providing a driving gas flow, a patient circuit comprising an inhalation line and an exhalation line arranged in a closed breathing circle connectable at one end to a patient and at the other end to the ventilator via a ventilator inlet, a fresh gas supply inlet connectable to the inhalation line, and an interface adapted to receive the modular breathing gas separator unit, comprising:

a first module comprising a volume reflector body adapted to separate ventilator driving gas and patient inhalation and/or exhalation gases; and a second module comprising a carrier adapted to support and carry the volume reflector body and connect the gas separator unit to an interface in the breathing system,
wherein the first and second modules of the gas separator unit are individually exchangeable,
wherein the carrier is adapted to connect the gas separator unit to the interface in the breathing system such that the modular breathing gas separator unit is connected between the ventilator and the closed breathing circle of the patient circuit, the gas separator unit adapted to be connected to the closed breathing circle via the ventilator inlet.

2. The modular breathing gas separator unit according to claim 1, wherein the carrier has an outer shape corresponding to a shape of the interface in the breathing system.

3. The modular breathing gas separator unit according to claim 1, wherein the carrier comprises a base and a sidewall arranged to surround the volume reflector body.

4. The modular breathing gas separator unit according to claim 3, wherein the sidewall comprises openings arranged to connect gas delivery lines to the volume reflector body.

5. The modular breathing gas separator unit according to claim 3, wherein the base comprises at least one opening through which liquid can pass.

6. The modular breathing gas separator unit according to claim 3, wherein the base of the carrier comprises a track defining a shape of a gas duct and wherein the track is adapted to receive a flexible gas tube arranged to convey the breathing gases.

7. The modular breathing gas separator unit according to claim 1, wherein the volume reflector body comprises a single gas duct comprising curved portions.

8. The modular breathing gas separator unit according to claim 7, wherein the volume reflector body has an integrated one-piece molded structure.

9. The modular breathing gas separator unit according to claim 7, wherein the gas duct is arranged so that at least two gas duct sections are located adjacent to each other and connected to each other by at least one solid portion.

10. The modular breathing gas separator unit according to claim 9, wherein the gas duct comprises at a respective free end a first port and a second port fluidly connecting the volume reflector body to the breathing system.

11. The modular breathing gas separator unit according to claim 10, wherein the gas duct has a shape of a folded tube so that free ends of the tube are placed adjacent to each other and wherein the at least two adjacent gas duct sections run side-by-side, and wherein the tube is spirally wound inwards towards a centre portion (CP) of the volume reflector body.

12. The modular breathing gas separator unit according to claim 11, wherein a folded end of the tube is arranged so that two central loops are formed in the centre portion of the volume reflector body.

13. The modular breathing gas separator unit according to claim 7, wherein the carrier is arranged to lock with the volume reflector body.

14. The modular breathing gas separator unit according to claim 6, wherein length of the gas duct is from 0.1 to 4 m.

15. The modular breathing gas separator unit according to claim 14, wherein total gas duct volume of the gas duct is from 0.1 litres to 2 litres.

16. The modular breathing gas separator unit according to claim 1, wherein the volume reflector body is a bag-in-bottle device, and wherein the carrier comprises a base, sidewalls and a cover arranged to surround the volume reflector body in the form of a bag in an airtight manner.

17. The modular breathing gas separator unit according to claim 1, wherein the volume reflector body comprises a first gas bag and a second gas bag, each of the first gas bag and the second gas bag is arranged to release or receive breathing gas or driving gas, wherein the first bag is arranged to release or receive breathing gas, and wherein the first bag is arranged to receive breathing gas when the second bag is arranged to release driving gas and vice versa.

18. The modular breathing gas separator unit according to claim 17, wherein the first bag and the second bag are not fluidly connected.

19. The modular breathing gas separator unit according to claim 1, wherein the modular breathing gas separator unit is connectable to the breathing system by insertion into the interface in the breathing system.

20. The modular breathing gas separator unit according to claim 1, wherein the carrier comprises a mechanical docking interface arranged to lock the modular breathing gas separator unit to the interface in the breathing system.

21. The modular breathing gas separator unit according to claim 1, wherein at least one of the volume reflector body and the carrier is made of plastic material.

22. The modular breathing gas separator unit according to claim 21, wherein one or both of the volume reflector body and the carrier are made of the plastic material and manufactured by blow-molding.

23. The modular breathing gas separator unit according to claim 1, wherein at least one of the volume reflector body and the carrier is disposable.

24. A breathing system comprising a ventilator providing a driving gas flow, a patient circuit comprising an inhalation line and an exhalation line arranged in a closed breathing circle connectable at one end to a patient and at the other end to the ventilator via a ventilator inlet, a fresh gas supply inlet connectable to the inhalation line, and an interface adapted to receive the modular breathing gas separator unit according to claim 1 such that the modular breathing gas separator unit is connected between the ventilator and the closed breathing circle of the patient circuit, the modular breathing gas separator unit adapted to be connected to the closed breathing circle via the ventilator inlet.

25. The modular breathing gas separator unit according to claim 3, wherein a detachable cover is provided to attach to the carrier.

26. The modular breathing gas separator unit according to claim 6, wherein a detachable cover is provided to attach to the carrier.

* * * * *